United States Patent [19]

Van der Voort

[11] Patent Number: 4,937,661

[45] Date of Patent: Jun. 26, 1990

[54] PROJECTION TELEVISION DISPLAY TUBE AND DEVICE HAVING BAND PASS INTERFERENCE FILTER

[75] Inventor: Andre Van der Voort, Ottawa, Ohio

[73] Assignee: North American Philips Corporation, New York, N.Y.

[21] Appl. No.: 217,259

[22] Filed: Jul. 11, 1988

[51] Int. Cl.[5] .......................... H04N 9/31; H04J 29/28

[52] U.S. Cl. .......................................... 358/60; 358/64; 313/474

[58] Field of Search .................... 358/60, 64, 231, 237; 313/474, 478

[56] References Cited

U.S. PATENT DOCUMENTS

| | | | |
|---|---|---|---|
| 4,376,949 | 3/1983 | Rowe | 358/60 |
| 4,633,131 | 12/1986 | Khurgin | 358/253 |
| 4,634,926 | 1/1987 | Vriens et al. | 358/253 |
| 4,683,398 | 7/1987 | Vriens et al. | 313/474 |
| 4,730,211 | 3/1988 | Hasegawa | 358/64 |
| 4,766,498 | 8/1988 | Spruit | 358/237 |

FOREIGN PATENT DOCUMENTS

| | | | |
|---|---|---|---|
| 0285224 | 10/1988 | European Pat. Off. | 313/474 |

*Primary Examiner*—Edward L. Coles, Sr.
*Assistant Examiner*—Kim Yen Vu
*Attorney, Agent, or Firm*—John C. Fox

[57] ABSTRACT

Projection-television display tube includes a band pass or Fabry-Perot interference filter between the display window and the luminescent screen, resulting in the elimination of undesirable luminescent emissions both above and below the wavelength region of interest. A three-tube color projection display device includes such a filter in at least the green emitting display tube.

14 Claims, 4 Drawing Sheets

PROJECTION TELEVISION DISPLAY TUBE AND DEVICE HAVING BAND PASS INTERFERENCE FILTER

BACKGROUND OF THE INVENTION

This invention relates to a cathode ray tube for projection television, and more particularly relates to such a tube having a interference filter between the display window and the luminescent layer, and also relates to a projection television device incorporating such a tube.

Tubes of this type are described in U.S. Pat. No. 4,634,926 assigned to U.S. Philips Corporation, in which the filter is composed of alternating layers of materials of high and low refractive index. The filter is designed to result in a marked increase in luminous efficiency of the tube in the forward direction, as well as improved chromaticity and contrast. Even further improvements are provided, especially in light gain in the corners of the display screen, by combining such an interference filter with an inwardly curved display window, as provided in U.S. Pat. No. 4,683,398, also assigned to U.S. Philips Corporation.

In these tubes, the interference filter can be characterized as an SWP filter, (short wave pass filter), that is, it has relatively high transmittance at wavelengths below a relatively narrow transition or cut-off region, and relatively high reflectance at higher wavelengths. See, for example, FIG. 6 of U.S. Pat. No. 4,683,398.

While such filters have generally proven to be quite effective for use in the red, green and blue tubes of a three-tube color projection television device, in practice it has been found that an objectionable off-color cast can occur. For example, variations in thickness distribution of the green filter can result in an objectionable bluish cast in the green tube incorporating a Tb-activated green phosphor.

This can be appreciated if it is realized that the emission spectrum of the green phosphor generally includes a blue component peaking at about 480 nm below the cut-off region of the filter. (Again, see FIG. 6 of U.S. Pat. No. 4,683,398, which includes a typical emission spectrum for a Tb-activated green phosphor). Generally, this blue component is not significant, due to its weakness relative to the dominant green component, peaking at about 540 nm, as well as to the greater sensitivity of the human eye to green.

However, failure to adequately control thickness distribution across the display window can lead to insufficient thickness in certain areas, and consequently to a shift of the cut-off region toward lower wavelengths. If this shift results in a partial cut-off of the main, desired component of emission, an objectionable off-color cast may appear in the areas of smaller thickness.

Accordingly, it is an object of the invention to provide a projection television display tube having an interference filter which substantially eliminates the blue component of emission of such a tube having a Tb-activated green phosphor screen.

It is another object of the invention to provide a projection television display tube having an interference filter which reflects emissions occurring at wavelengths both above and below the region of primary color emission.

SUMMARY OF THE INVENTION

According to the invention, a projection television display tube is provided with an interference filter between the display window and the luminescent layer, characterized in that the filter is a band pass or Fabry-Perot filter, for example, having layers of relatively high (H) and low (L) refractive index materials in the sequence

122121221 where 1 and 2 are either high (H) and low (L) or low (L) and high (H) refractive index layers, respectively. While such a filter may be composed of as few as nine layers, additional 21 layer pairs may be added, as indicated by 1221 . . . 21221 resulting in a filter having from 11 up to as many as 41 layers.

As is known, such additional layers generally result in increased definition as well as increased half width of the pass band. See, for example, Thin-Film Optical Filters, H. A. Macleod, page 173. This is significant because the pass band shifts to lower wavelengths as the angle of incidence of the emitted radiation increases. Thus, the half width of the pass band must be sufficiently large to pass substantially all of the desired emissions from the phosphor throughout a range of angles of incidence of the emitted radiation and sufficiently small to reflect throughout said range of angles undesired emissions.

DESCRIPTION OF THE PREFERRED EMBODIMENTS

Figure 1:
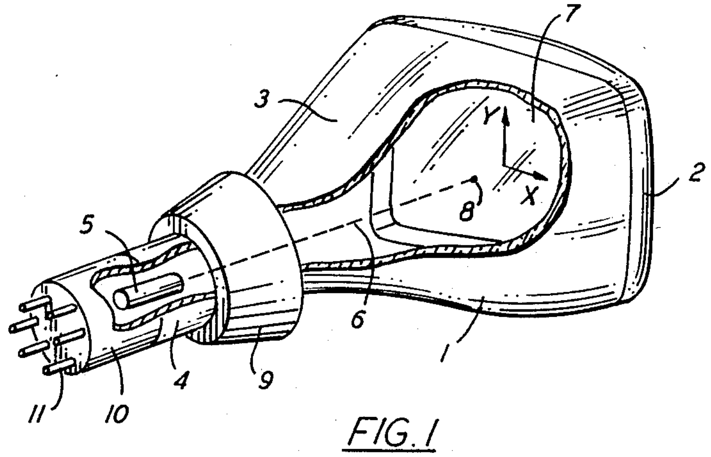
FIG. 1 is a perspective view, partly in section, of a projection television display tube of the invention.

FIG. 1 is a perspective view partly broken away of a projection television display tube according to the invention. The tube comprises a glass envelope 1 which consists of an inwardly curved display window 2, a cone 3, and a neck 4, within which is an electron gun 5 for generating an electron beam 6. Said electron beam is focused on a curved display screen 7 to form a spot 8. The display screen 7 is provided on the inside of the display window 2. The electron beam is deflected over the display screen 7 in two mutually perpendicular directions x, y by means of a system of deflection coils 9. Base 10 is provided with connection pins 11.

Figure 2B:
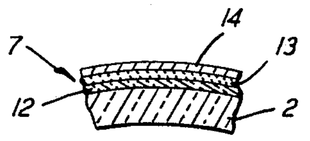
FIG. 2*b* is a detailed cross-section of a portion of the window, screen and filter of FIG. 2*a;*
Figure 2A:
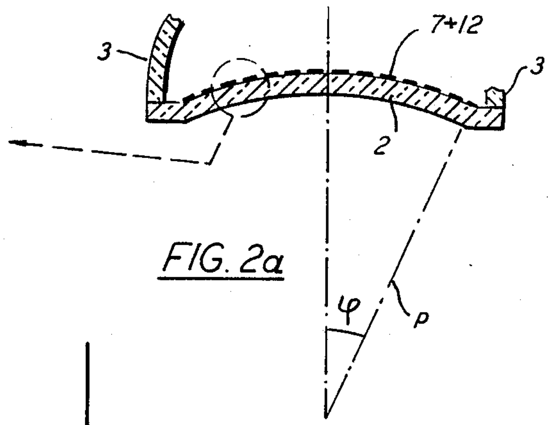
FIG. 2*a* is a diagrammatic cross-section of a portion of the front of the display tube, showing the display window, luminescent screen and one embodiment of a band pass interference filter of the invention.
Figure 7:
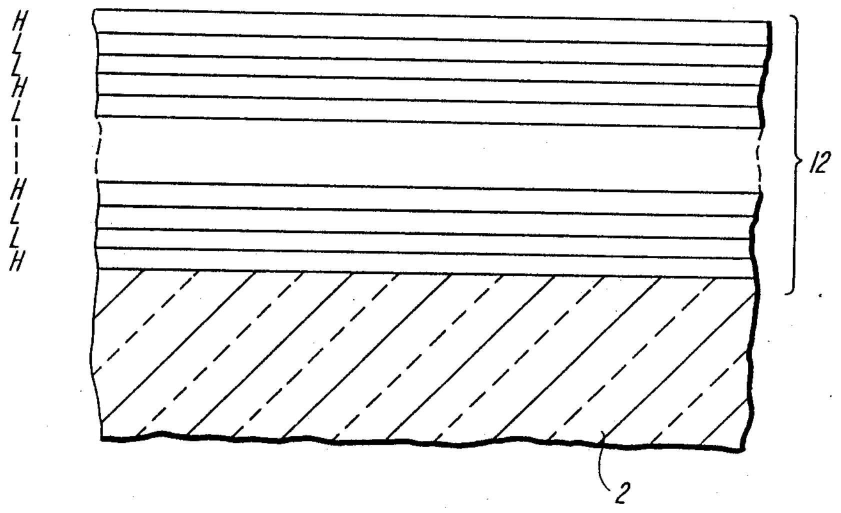

FIG. 2*a* is a partial sectional view of the curved display window 2, the multilayer interference filter 12, and the curved display screen 7. As shown in FIG. 7, the filter 12 is composed of at least nine layers, here in the sequence HLLH . . . LHLLH. The high and low index layers may be exchanged, so that the sequence becomes LHHL . . . HLHHL. Additional layers may be added in pairs of sequence LH or HL, respectively, to produce a filter having from eleven to as many as forty-one layers. As seen in the more detailed FIG. 2*b*, the display screen 7 consists of a layer of luminescent material (phosphor) 13 and a thin aluminum film 14 (the so-called "aluminum backing"). The display window has an angle of curvature Ø and is preferably spherical, having a radius of curvature Ø. The phosphor 13 is a Tb-activated phosphor with 14 a peak wavelength of emission $\lambda=545$ nm.

Figure 3:
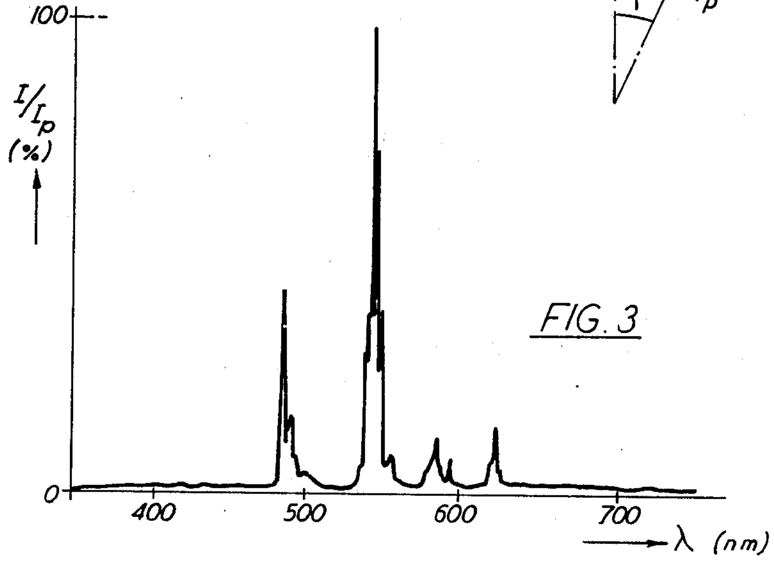
FIG. 3 is an emission spectrum of a Tb-activated green phosphor suitable for use in a display tube of the invention.

FIG. 3 is an emission spectrum of a green emitting yttrium aluminum garnet phosphor activated by terbium (YAG:Tb), the presently preferred phosphor for the green tube of a three-tube color projection television device. In addition to the dominant green emission peaking at 545 nm, there are also emissions in the red region, peaking at about 580 to 630 nm, and in the blue region, peaking at about 480 nm.

Figure 4:
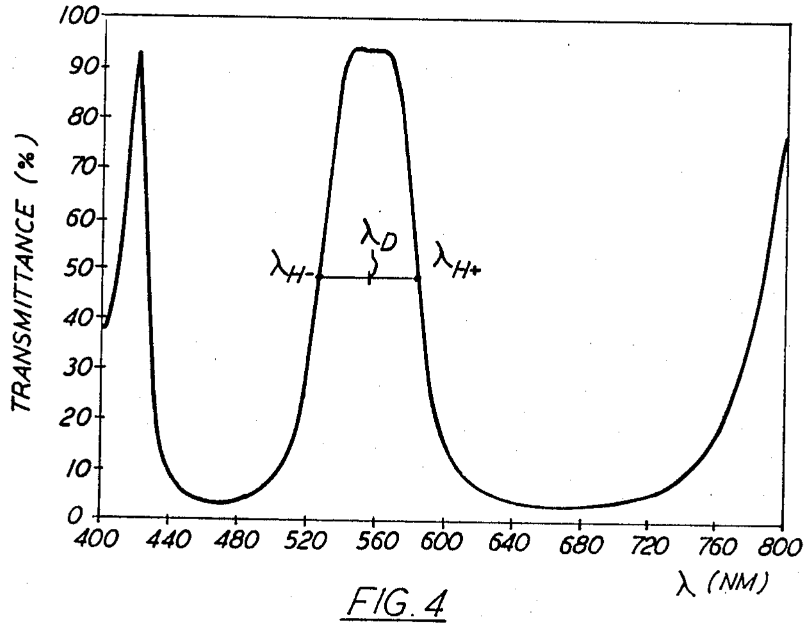
FIG. 4 is a computed transmittance spectrum of a band pass filter of the invention at an incidence angle Ø of 0 degrees.

A suitable band pass filter for such a phosphor is one which substantially reflects the blue and red emissions and passes the green emissions. FIG. 4 is a computed transmittance spectrum of such a band pass filter at an angle Ø of incident radiation of 0 degrees, i.e., normal to the plane of the filter in the case of a flat display window, or normal to a tangent of the surface of a curved display window. The filter is composed of layers H of $TiO_2$ having a refractive index of 2.35, and layers L of $SiO_2$ having a refractive index of 1.44. The sequence of layers is

HLHHLHLHLHHLH

While other filter materials may be used, such as $Al_2O_3$, $HfO_2$, $Ta_2O_5$, MgO, $CeO_2$, ZnS, $MgF_2$, $Nb_2O_5$ and $ZrO_2$, it is at present preferred to us $SiO_2$ and $TiO_2$ due to their hardness and durability. The layers have an optical thickness nd of approximately 0.25 $\lambda_D$, where n is the refractive index of the material, d is the physical thickness, and $\lambda_D$ is the design wavelength, that is, the central wavelength for the pass band, defined as the midpoint of a line connecting the sides of the pass band at half height, at normal incidence. The points of intersection of the line with the sides are designated $\lambda_{H-}$ and $\lambda_{H+}$.

For normal incidence, as shown by FIG. 4, $\lambda_D$ is the central wavelength, 552 nm, $\lambda_{H-}$ is 524 nm and $\lambda_{H+}$ is 580 nm.

Figure 5:
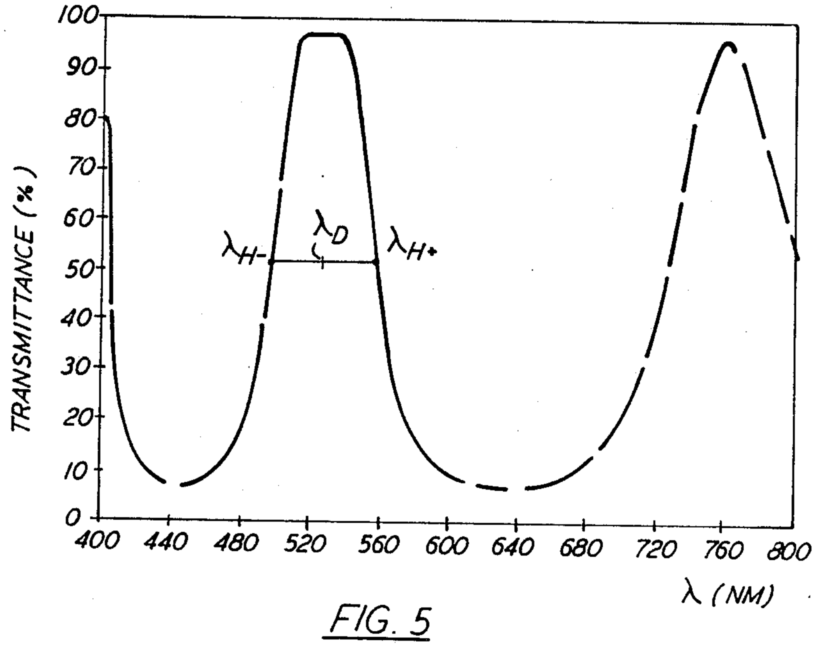
FIG. 5 is a transmittance spectrum similar to that of FIG. 4 for an incidence angle Ø of 36 degrees.

FIG. 5 is a computed transmittance spectrum for the filter of FIG. 4, for an incident angle of 36 degrees. As may be seen, central wavelength has shifted from $\lambda_D$ to 525 nm, $\lambda_{H-}$ is 580 nm and $\lambda_{H+}$ is 550 nm. Thus, substantially all of the green emissions are transmitted by the filter throughout the range of incident angles from 0 to 36 degrees.

In designing a filter according to the invention, it will be appreciated that the angle of incidence at which the filter begins to reflect rather than transmit radiation increases as the number of layers decreases, resulting in less concentration of the light output in the forward direction. In practice, it has bee found that the value of such angle should in general not be permitted to exceed about 42 degrees.

Figure 6:
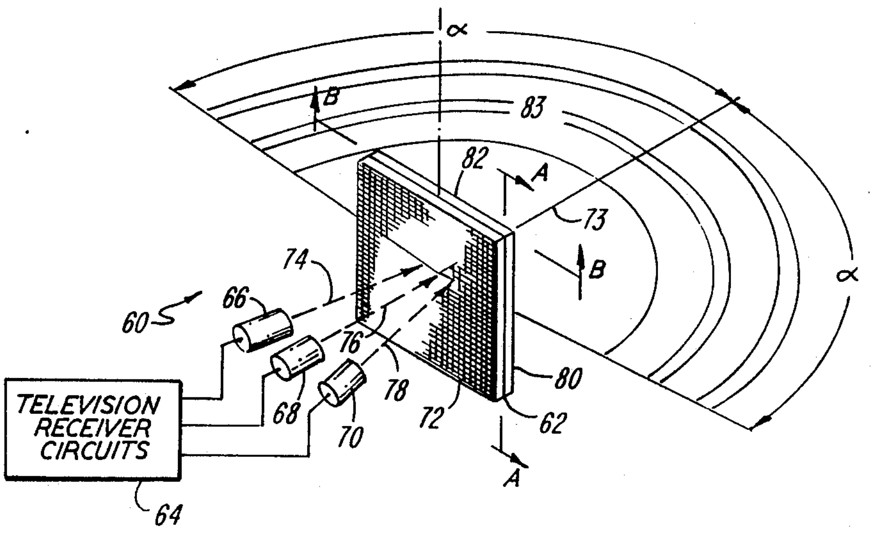
FIG. 6 is a diagrammatic representation of a three-tube color projection television device incorporating at least one display tube of the invention and FIG. 7 is a diagrammatic cross-section of a portion of one embodiment of the band pass filter of the invention.

While the description of the invention has thus far been in terms of a filter for a green display tube, it is to be understood that such band pass filters are also suitable for use with the red and blue tubes, with or without curved display windows, such as are found in a conventional 3-tube color projection television device. Such a device 60 is shown diagrammatically in FIG. 6, employing a rear projection screen 62. Video signals are received by television receiver circuits 64 and are projected through individual red, green and blue cathode ray tube (CRT)/lens projector assemblies 66, 68, and 70, onto the rear surface 72 of projection screen 62. The three CRT/lens projector assemblies 66, 68 and 70 each include a CRT and associated projection optics, and are arranged horizontally with respect to screen 62. The green assembly 68 is located so as to have its optical axis 66 coincide with the central projection axis, while the red and blue assemblies 66 and 70, having optical axes 74 and 78 respectively, are laterally and angularly offset from the green axis 76.

Since the red and blue phosphors presently used do not exhibit potentially undesirable emissions at lower wavelengths, the use of the SWP filter of the prior art is acceptable for these tubes, where the use of an interference filter is desired.

What is claimed is:

1. A projection television display tube comprising in an evacuated envelope a display screen on the inside of a display window in the wall of the envelope, said display screen comprising a layer of a luminescent material and an aluminum backing layer, the tube further comprising multilayer interference filter between the luminescent material layer and the display window, the filter comprising a number of layers having a high (H) refractive index and a low (L) refractive index, characterized in that the interference filter is a band pass filter in which the filter layers are arranged in the sequence

1221...21221 where 1 and 2 are high (H) and low (L), or low (L) and high (H) refractive index layers, respectively.

2. The projection television display tube of claim 1 in which the filter is composed of at least 9 layers.

3. The projection television display tube of claim 2 in which the filter is composed of from 11 to 41 layers.

4. The projection television display tube of claim 1 in which the display window is flat.

5. The projection television display tube of claim 1 in which the display window is curved and has an angle of curvature Ø where Ø is the angle between a line normal to the center of the display screen and a line normal to the part of the display screen farthest remote from the center.

6. The projection television display tube of claim 5 in which Ø is from about 5 to 25 degrees.

7. The projection television display tube of claim 1 in which the filter layers have an approximate optical thickness nd $=\frac{1}{4}\lambda_D$, where n is the refractive index of the layer material, d is the physical thickness of the layer, and $\lambda_D$ is the central wavelength of the pass band at an angle of incidence of the phosphor emission of 0 degrees.

8. The projection television display tube of claim 1 in which the luminescent material is a Tb-activated phosphor emitting green.

9. The projection television display tube of claim 8 in which the phosphor is YAG:Tb.

10. The projection television display tube of claim 9 in which $\lambda_D$ about 552 nm.

11. A three-tube color projection television display device having red, blue and green emitting display tubes, the tubes each comprising in an evacuated envelope a display screen on the inside of a display window in the wall of the envelope, said display screen comprising a layer of a luminescent material, characterized in that at least one of the tubes comprises a band pass or filter between the luminescent material layer and the display window, in which the filter layers are arranged in the sequence 1 2 2 1 . . . 2 1 2 2 1 where 1 and 2 are high (H) and low (L), or low (L) and high (H) refractive index layers, respectively.

12. The projection television display tube of claim 11 in which the tube comprising the band pass filter is the green emitting tube.

13. The projection television display tube of claim 12 in which the remaining tubes also include a band pass filter.

14. The projection television display tube of claim 12 in which the remaining tubes include an SWP filter.

* * * * *